United States Patent
Dec et al.

(10) Patent No.: US 8,805,301 B2
(45) Date of Patent: Aug. 12, 2014

(54) DROP ZONE RALLY POINT BEACON

(75) Inventors: Albert K. Dec, Deerfield, NH (US);
Marie Y. Alfred, Framingham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 250 days.

(21) Appl. No.: 13/315,399

(22) Filed: Dec. 9, 2011

(65) Prior Publication Data
US 2013/0149960 A1    Jun. 13, 2013

(51) Int. Cl.
*H04B 1/38*    (2006.01)

(52) U.S. Cl.
USPC ........................................ 455/90.1; 455/41.2

(58) Field of Classification Search
USPC .................. 455/456.1, 90.1, 90.2, 41.2, 40; 342/385, 386
See application file for complete search history.

(56) References Cited

U.S. PATENT DOCUMENTS

| | | | |
|---|---|---|---|
| H002015 | H * | 3/2002 | Waters .......................... 375/240 |
| 7,307,595 | B2 | 12/2007 | Schantz et al. |
| 2008/0088507 | A1 * | 4/2008 | Smith et al. ................... 342/386 |

* cited by examiner

*Primary Examiner* — Lewis West
(74) *Attorney, Agent, or Firm* — Maine Cernota & Rardin; David A. Rardin

(57) ABSTRACT

A VLF beacon operates in the near field of the antenna, providing a low impedance (magnetic) wave located by employing simple amplitude gradient and phase alignment direction finding (DF) methods. When rotated, the beacon antenna radiates its signal with little attenuation. Beacon antennas include a loop antenna which has a $1/r^3$ B-field amplitude relationship with distance. The antenna radiation range is limited, but the detectable near field signal is strong. The receiver comprises a simple 2-channel RF front end with filtering and an A/D converter. The antenna for each channel is a much smaller ferrite rod loaded loop.

20 Claims, 8 Drawing Sheets

300

TRANSMITTER AND LOOP ANTENNA
FIG. 1

RECEIVER AND DUAL FERRITE ROD ANTENNAS
FIG. 2

DROP ZONE RALLY POINT BEACON

FIELD OF THE INVENTION

The invention relates to an ELF/VLF beacon operating in the near field of the antenna, providing a low impedance (magnetic) wave located by employing simple amplitude gradient and phase alignment direction finding (DF) methods.

BACKGROUND OF THE INVENTION

Air-dropped cargo pallets do not always land in designated locations. Finding them in GPS denied environments, in darkness, in adverse weather, or on rough terrain is difficult and dangerous. An inexpensive tag or drop zone beacon identifying the cargo is needed that would radiate a signal from which the recipient could determine the proximity and direction of the pallet.

Paratroopers jumping from airplanes usually convene at a designated location before beginning their mission. GPS is the preferred approach for the individual to find the "rally point." There are areas where GPS reception is poor or unavailable such as in heavily wooded or mountainous areas or in urban areas. For this, a rally point beacon, similar to the drop zone beacon, would emit a signal towards which the paratrooper would move.

Conventional methods place low duty cycle VHF and UHF beacons on the cargo which can be tracked from land, air or space. The beacons can also relay the GPS position of the cargo. Other systems that have been utilized are similar to LoJack® (auto anti-theft device), active tags used for tracking wildlife, or similar pet collars with homing radios. LoJack® is a registered trademark of LoJack Corporation in Westwood, Mass.

Most deployed comms systems operate at frequencies above 30 MHz where point-to-point communications is dependent on line-of-sight propagation. Hence, obstructions such as hills, trees, and metal buildings can prevent the communications link to close. HF comms (2-30) MHz are not reliable for near-in links because sky wave propagation can cause the signal to "skip over" a nearby receiver. Propagation conditions can also change dramatically between day and night and during sun spot activity.

Previous approaches relied heavily on perfect conditions, such as upright landings, smooth terrain with no obstacles where line-of sight (LOS) communications (comms) are possible for several kilometers (kms), for acquiring GPS coordinates and communicating position. In cases where only beacons are possible, directing airborne or national assets to track regular cargo such as K-rations, ammunition, or fuel is not cost effective. Unless direct LOS comms are possible, direction finding schemes using simple, low-cost receivers to locate the beacons are very susceptible to multipath ambiguities.

Furthermore, smart GPS-guided parachutes often go astray leaving cargo drops widely dispersed on the ground. The placement of VHF, UHF, and microwave beacons or tags has not been very successful because communications at these frequencies is dependent on line-of-sight (LOS) propagation with little to no blockage between the beacon and the soldier-held receiver.

There is a need for guaranteed short range communications in various field and battle space applications.

SUMMARY OF THE INVENTION

VLF signals are impervious to obstacles (cargo on the drop pallet, local trees, rocks, or urban structures) or multipath effects over short ranges. VLF signals can penetrate most materials including ground. The fields radiated by loop antennas have high magnetic field intensities compared to electric fields. The magnetic fields are proportional to $1/r^3$ and $1/r^2$. High magnetic field waves have very low near-field impedances which tend to minimize reflections from objects and partially conductive structures. The magnetic field amplitude range dependence on $1/r^3$ allows a receiver to see rapid amplitude variations with distance, thereby helping to resolve bearing ambiguities with the direction finding (DF) solution by noting comparative changes in amplitude as the individual walks. For embodiments, a dipole can supplement the DF capability by resolving the bearing ambiguity of the loop antenna and, combined with the loop, identify the direction from which the transmitted signal is coming.

Embodiments of the system are difficult to jam because intentional jamming would require proximity of the jammer to the beacon transmitter and receiver. The jammer would require a large antenna and much power, thus exposing the intension of such sites.

Shielding is not a major issue at VLF, therefore cost can be low; hence, simple lumped components in a plastic case with a loop of wire for an antenna are sufficient for the transmit portion of embodiments of the beacon system. The system duty cycle can be reduced significantly to conserve battery life and hence increase the number of hours the system can operation.

In embodiments, the distance to the cargo to be found or the rallying point is not more than one to two kilometers away. A VLF beacon operating in the near-field of the antenna would provide a low impedance (magnetic) wave, impervious to blockage from obstacles or terrain and less prone to multipath propagation, which could be located by employing simple amplitude gradient or phase alignment direction finding (DF) methods. When cargo pallets tip over, the beacon antenna would still be able to radiate its signal with little attenuation. For embodiments, the antenna for this beacon would be a loop antenna which has a $1/r^3$ B-field amplitude relationship with distance. Therefore, the antenna does not radiate far, but has a strong detectable near field. Receiver embodiments comprise a simple 2-channel RF front end with filtering and an A/D converter. The antenna for each channel is a much smaller ferrite rod loaded loop. In embodiments, the receiver and antennas are mounted to an individual's arm using a Velcro arm band thus not impairing his use of his weapon.

Invention embodiments include a near-field coupling beacon system comprising a VLF/ELF band transmit loop antenna at a transmit site; a VLF/ELF band transmitter; a plurality of ferrite loaded loop receive antennas at a receive site; and a receiver detecting field polarity as received by the plurality of ferrite loaded loop receive antennas; whereby near-field coupling between the transmit loop antenna and the plurality of ferrite-loaded loop receive antennas enables communication between the transmit site and the receive site. In embodiments, the frequency band of operation is about 5 kHz to about 3 MHz; about 5 kHz to 50 kHz; and about 50 kHz to about 3 MHz; and operation is independent of orientation of the transmit antenna. Other embodiments provide that the transmitting antenna comprises an air-core loop comprised of multiple turns of insulated wire wound on a cylindrical form. For some embodiments, the received field polarity relationship between the magnetic field received by the loop of the plurality of ferrite loaded loop receiving antennas and the electric field received by the dipole of the plurality of ferrite loaded loop receiving antennas identifies the direction of the signal source. For additional embodiments, the VLF/ELF band transmitter emits continuous carrier wave (cw); emits pulsed continuous carrier wave; simple binary frequency shift keying (FSK) whereby text messages are sent; and pulsed continuous carrier wave whereby the receiver locates the VLF/ELF band transmitter beacon. In embodiments, the operating terrain of the near-field coupling beacon system is lossy ground at the frequency band of operation. Other embodiments provide a modulating circuit encoding at least one of a pulsed output and an FSK signal to relay symbol information such as text and/or voice. Continued embodiments include a low noise, high gain analog input with pre-selection and filtering to condition the signal before analog to digital conversion; and an automatic gain control (AGC) circuit tracking in both channels prior to digitization. For yet another embodiment, the receiver that is used to locate a rally point is reset on-the-fly, during operation, to retune to a specific identifier signal associated with assets whereby designated individuals quickly locate the assets. For yet further embodiments, vehicle to vehicle communications in a jammed environment is provided that enables text and voice communication within a convoy operation. For more embodiments, near-field phenomenology of the long-wave RF beacon comprises a plurality of transmitters located geographically dispersed from each other to provide a reliable signal to gain reference points whereby navigation in a GPS denied environment is provided.

Additional embodiments of the invention provide a near-field coupling beacon communication system comprising a VLF/ELF band transmit loop antenna at a transmit site; a VLF/ELF band transmitter; a plurality of ferrite loaded loop receive antennas at a receive site; and a receiver detecting field polarity as received by the plurality of ferrite loaded loop receive antennas; whereby near-field coupling between the transmit loop antenna and the plurality of ferrite-loaded loop receive antennas provides communication between remote outpost, Coalition Outpost (COP), Forward Operating Base (FOB) and beyond line-of-sight locations, wherein the near-field coupling beacon system provides communication over, around and through obstacles degrading propagation at RF communication frequencies outside frequencies of the near-field coupling beacon system, whereby bit error rates are maintained.

Further invention embodiments include a method for near-field direction finding comprising transmitting a beacon signal from a VLF/ELF band transmit loop antenna at a transmit site comprising a VLF/ELF band transmitter at a beacon site; receiving the beacon signal at a receive site comprising a plurality of ferrite loaded loop receive antennas at a receive site and a receiver detecting field polarity as received by the plurality of ferrite loaded loop receive antennas; whereby near-field coupling between the transmit loop antenna and the plurality of ferrite-loaded loop receive antennas enables communication between the transmit site and the receive site. Another method embodiment comprises motion (translational and or rotational motion such as turning and or walking) to ascertain the peak readings and directions.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The following detailed description provides example embodiments of the presently claimed invention with references to the accompanying drawings. The description is intended to be illustrative and not limiting the scope of the present invention. Embodiments are described in sufficient detail to enable one of ordinary skill in the art to practice the subject invention. Other embodiments may be practiced with some variations without departing from the spirit or scope of the subject invention.

Communications at frequencies much lower than VHF, UHF, and microwave (such as at the VLF band (10 kHz to 100 kHz)), propagate with minimal effects through terrain, fauna, weather, and man-made obstacles. Because the frequency is so low, propagation is limited to a few kilometers and has an inverse cubic relationship with distance. Transmitters for the beacon can be inexpensive and small.

Figure 1:
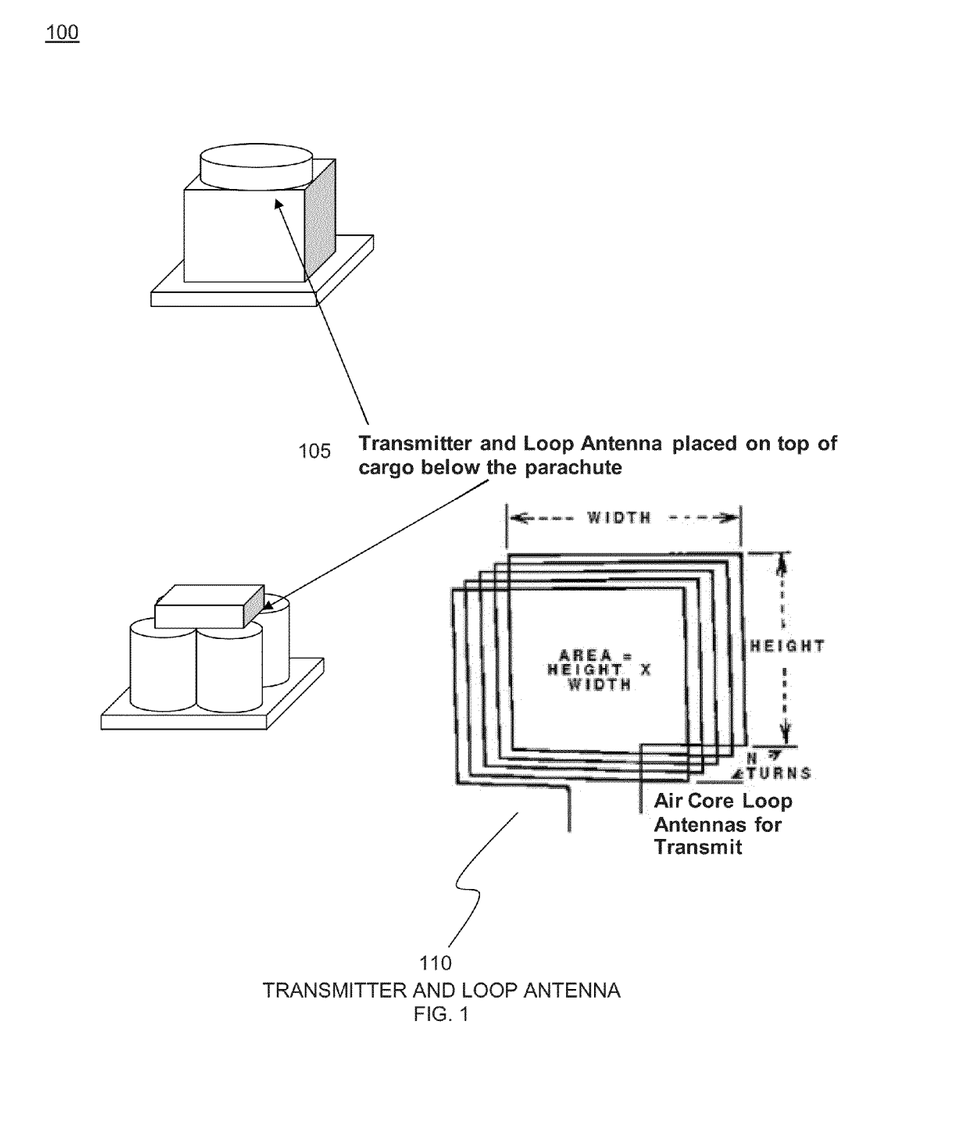
FIG. 1 depicts a transmitter and loop antenna configured in accordance with one embodiment of the present invention.

FIG. 1 depicts a transmitter and loop antenna 100 for an embodiment of the drop zone beacon system. In embodiments, a loop antenna coil is placed on the top of a pallet with an inexpensive Class E transmitter powered by a battery. The transmitter output pulse sequence is set to identify the type of cargo for embodiments. The on switch in embodiments is tied to the parachute ripcord and is started as the chute leaves the airplane. The system will radiate for several hours, giving a chance for individuals on the ground to DF and locate the pallet. In embodiments, transmitter and loop antenna 105 are placed on top of cargo, below the parachute. Air core loop antennas 110 are employed in embodiments for transmitting. Antenna parameters comprise height, width, turns, and area equal to height times width for rectangular antenna embodiments.

Figure 2:
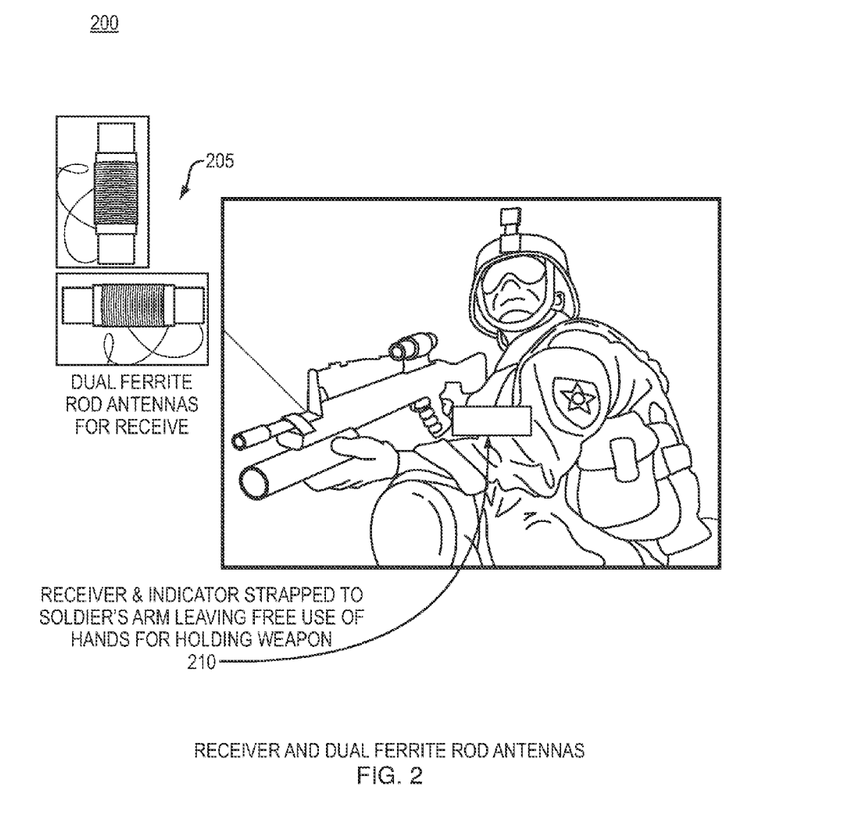
FIG. 2 depicts a receiver and dual ferrite rod antennas configured in accordance with one embodiment of the present invention.

FIG. 2 depicts a receiver and dual ferrite rod antenna 200 for an embodiment of the beacon system. Dual ferrite rod antennas are employed by embodiments for receiving 205. In embodiments, the receiver and indicator are strapped to individual's arm, leaving free use of hands for holding objects 210.

Embodiments provide guaranteed short range communications in various field and battle space applications. These applications include air-dropped cargo tagging as shown in FIGS. 1 and 2 for quick location and recovery during day or night in any weather condition; beacons for paratrooper rallying point navigation; short range communications (comms)

(10 m to 10 km) in jammed environments such as in convoys utilizing improvised explosive device (IED) suppression jamming and navigation beacons in GPS denied areas, etc. Most of these applications do not require large data transfers to send the vital information. Beacons and comms can simply emit continuous carrier wave (cw), pulsed cw, or simple binary frequency shift keying (FSK) to send a text message, or just emit a pulsed cw to let a receiver locate the beacon.

As mentioned, HF (2-30 MHz) and above 30 MHz comms systems are vulnerable to environmental constraints. However, as the frequency is lowered to ELF and VLF frequencies (5 to 50 kHz), the emitted signal wavelength is so long that communications distances are considered a small fraction of the wavelength and hence the transmit and receive antennas are in the near field of each other.

At these frequencies, the propagation mode is mostly through inductive coupling between the antennas. Moreover, certain antennas can enhance this coupling. The impact of nearby objects on the coupling is minimal compared to the multipath interference at higher frequencies caused by reflections off objects. However, mutual coupling with magnetic materials such as iron pipes will be greater and could have some effects. Although atmospheric and man-made noises can be high at the VLF frequencies, filtering and choice of frequency can mitigate many of these issues and improve the signal-to-noise ratio (SNR).

Embodiments provide a beacon system consisting of loop and dipole antennas, a transmitter and a receiver with filtering that supports air-dropped cargo. For embodiments, the transmitter is disposable (low cost) and low power (<1 Watt) feeding a wire loop antenna using a capacitive tuner. Receiver embodiments may be more complex and utilize two receive channels to which two smaller antennas are connected to provide polarization diversity and amplitude gradient comparisons to DF on the transmitter. Processing requirements could be met by a laptop computer acting as a software radio and performing the signal analyses. The receiver front end amplifies and filters the incoming signals from the antennas. This is then be digitized by processors as simple as a computer sound card, and then analyzed.

Near Field Coupling and Propagation Phenomenology.

Following is a discussion of the propagation field's phenomenology and transmitter and receiver components. In the VLF/ELF band, the field wavelength is several tens of kilometers long. In embodiments, the distances over which this system operates are 100 meters to 5 km. Therefore, propagation is in the near field of the transmit and receive antennas. Efficient antennas are usually in the order of $\lambda/4$ to $\lambda/2$ long. In some embodiments, such long antennas would not be feasible with the proposed applications. Hence, for embodiments, the antenna is a small loop antenna that would fit on a pallet and be held by an individual. For DF purposes, an individual might also attach a "thick" dipole to receive the E-field component of the wave and provide a solution to the DF bearing ambiguity. The E-field will flip in polarity whether the individual is pointed towards or pointed away from the transmit loop whereas the receive loop sees no change.

Transmit Loop Antenna.

Figure 3:
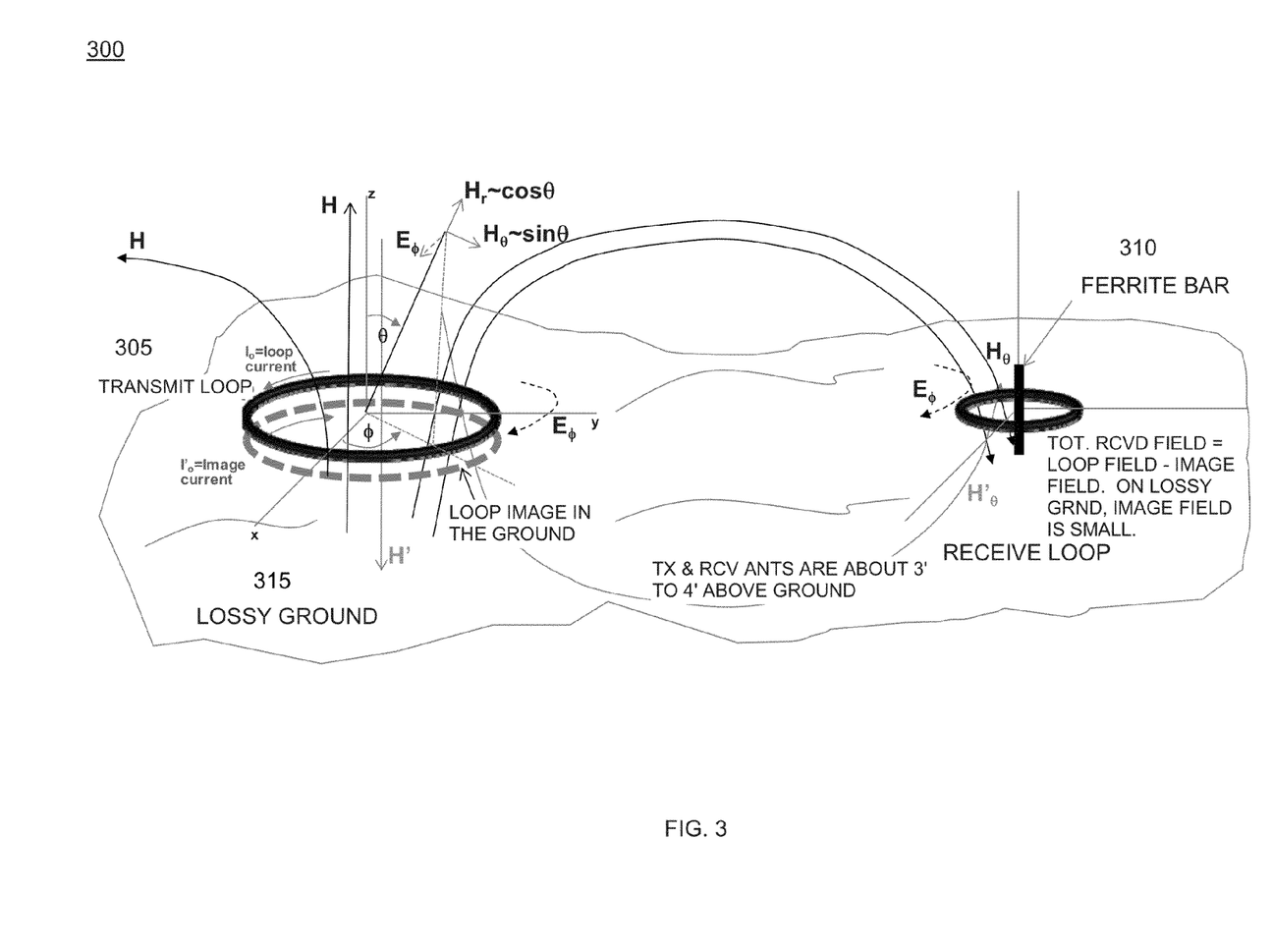
FIG. 3 depicts near-field coupling between a transmit loop antenna and a ferrite-loaded receive loop and dipole antennas over a lossy ground plane configured in accordance with one embodiment of the present invention.

For embodiments, the transmit loop antenna is an air-core loop comprised of multiple turns of insulated wire wound on a cylindrical form. When an alternating current is passed through the coil of wire, a magnetic field and electric field emanate in free space as shown in FIG. 3 . . . .

$$B_r(r, \theta) = \frac{\mu_0 \beta^3 m}{4\pi} \left[ \frac{j}{(\beta r)^2} + \frac{1}{(\beta r)^3} \right] e^{j(\omega t - \beta r)} \cos(\theta)(1 + \mathcal{R}) \quad (0.1)$$

$$B_\theta(r, \theta) = \frac{-\mu_0 \beta^3 m}{4\pi} \left[ \frac{1}{(\beta r)} - \frac{j}{(\beta r)^2} - \frac{1}{(\beta r)^3} \right] e^{j(\omega t - \beta r)} \sin(\theta)(1 + \mathcal{R}) \quad (0.2)$$

$$E_\phi(r, \theta) = \frac{\varsigma \beta^3 m}{4\pi} \left[ \frac{1}{(\beta r)} - \frac{j}{(\beta r)^2} \right] e^{j(\omega t - \beta r)} \sin(\theta)(1 + \mathcal{R}) \quad (0.3)$$

Where:
B=magnetic field density in Wb/m$^2$=$\mu_o$H where H=magnetic field in amps/m
E=electric field in Volts/m
m=$I_0$NArea is the magnetic moment
$I_o$=current flowing through the loop in amps
N=the number of turns making up the loop
Area=the area enclosed by the loop (whether it is circular or square)
$\mathcal{R}$=image coefficient; can be calculated using J. R. Wait's formula (0<|$\mathcal{R}$|<1)
$\mu_o$=the free space magnetic permeability=$4\pi \times 10^{-7}$ Henries/m
$\omega$=$2\pi \times$freq (radians/s)
$\beta$=$2\pi/\lambda$ (radians/m) (the wave number)
$\lambda$=c/freq (meters) where c is the speed of light
r=dist. from center of loop (m) (equations apply to r>Radius of the loop)
$\varsigma$=the free space wave impedance (377 ohms)

When the loop is located over a lossy ground plane, an image is created at an equal electrical distance within the ground which also radiates a magnetic and electric field. The image, however, is excited only by the magnetic field H$_r$ of the loop. The current in the image loop is reversed from that in the fed loop. Therefore, on a perfectly conductive ground plane, the image fields would be equal to and opposite to those of the transmit loop. The outgoing fields would cancel each other and it would not be possible to operate. On lossy ground, the image loop current is much less in amplitude and therefore the total radiating fields, though less than for a loop in free space, can be measured as $\mathcal{R}$. The resultant near field can be used to transmit information.

FIG. 3 depicts near-field coupling 300 between transmit loop antenna 305 and ferrite-loaded receive loop and dipole antennas 310 over a lossy ground plane 315. There is no image in free space. On a perfectly conductive ground plane, the image causes all fields to disappear.

The loop has an only magnetic field along its axis. This is represented as H$_r$($\theta$=0), which is the field that excites the image. The field at the receive loop is due to H$_\theta$ only from the primary loop and its image when $\theta$=90°. This term has the same near field amplitude as H$_r$ but has a 1/r term known as the radiation term which dominates when the distance r becomes larger. When the loops are oriented with the E-field tangent to the ground, propagation is almost nil thereby supporting near-field quasi-static phenomenology only. If the transmit loop is tipped on its side (axis tangent to ground), then a vertically polarized E-field will radiate as a ground wave at these low frequencies. Nevertheless, quasi-static magnetic behavior will exist in the near field except that both H$_r$ and H$_\theta$ will contribute.

Figure 4:
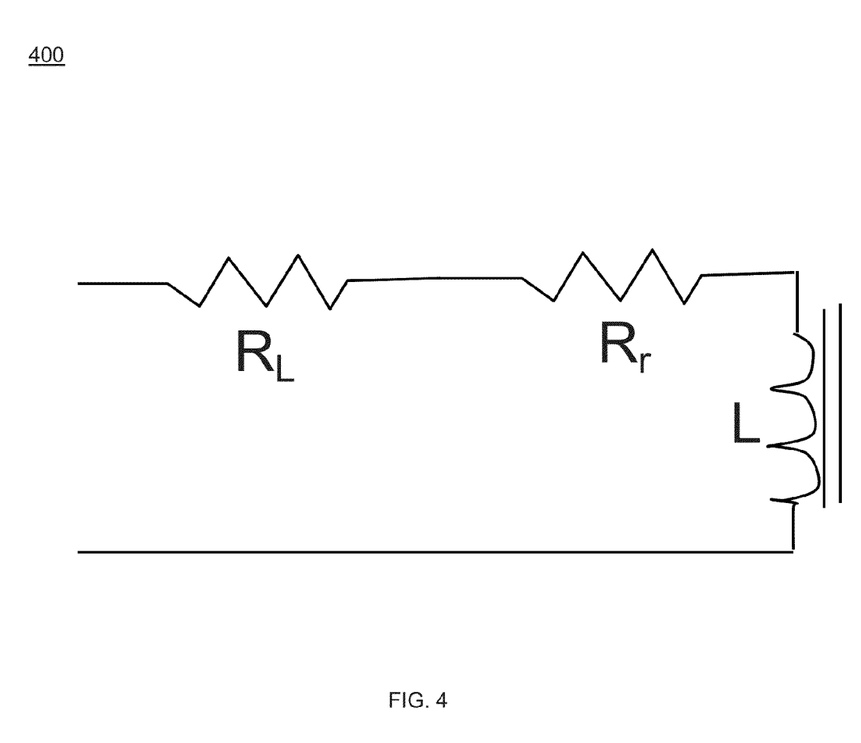
FIG. 4 is an equivalent loop circuit configured in accordance with one embodiment of the present invention.

FIG. 4 depicts a representation of the transmit loop as a lumped circuit 400. Embodiments provide an equivalent circuit of the loop where RL is the wire loss and loss in the image, Rr is the radiation resistance of the loop, and L is the loop inductance. The ohmic resistance is comprised of two series resistances due to the radiation resistance and the resistance of the copper loop itself. For embodiments, the combined resistance is usually less than 1 ohm for a single turn loop made with copper wire. The radiation and ohmic resistances are approximated by:

$$R_{radiation} = 320N^2 \mu_r \pi^4 \frac{A^2}{\lambda^4} \quad (0.4)$$

$$R_{loss} = \frac{b}{a}\sqrt{\frac{\omega \mu_o}{2\sigma}} \quad (0.5)$$

Where
b is the radius of the loop
a is the radius of the loop wire
σ is the conductivity of the wire material The reactive portion of the loop impedance is due to its self-inductance which is given by:

$$L_{loop} = \mu_o \mu_r N^2 b \ln\frac{b}{a} \quad (0.6)$$

These formulas for the equivalent circuit are useful to represent the antenna in transmitter/receiver designs.

Receive Loop Antenna.

In embodiments, ferrite loaded loop antennas are used as receiving antennas because the diameter of the loop can be reduced while keeping the same effective capture area. The ferrite rod couples to the magnetic field in a similar manner as the dipole couples to the electric field. The captured magnetic field is passed through the center of a smaller coil creating an induced voltage. Hence, the ferrite enhances the effective capture area of the loop. For embodiments, having large gain in the receive mode at these lower frequencies does not benefit the gain/temperature (G/T) since atmospheric and man-made noises are very high.

The voltage induced in a loop antenna by an external magnetic field is proportional to the derivative of the magnetic flux through the area enclosed by the loop. The flux is given by the integral of the B-field orthogonal to the plane of the loop.

$$\Lambda = \int \vec{B} \cdot \vec{d}A = B\text{Area} \cos\phi \quad (0.7)$$

The voltage induced in the receive loop antenna is given by:

$$V_{oc} = -\frac{\partial \Lambda}{\partial t} = -j\omega\mu_r N(\text{Area})B^{inc}\cos\varphi \quad (0.8)$$

Where:
$V_{oc}$=open circuit voltage of the receive loop antenna
$\mu_r$=relative permeability of ferrite rod around which the loop is wrapped
N=number of turns in the receive loop
Area=area enclosed by the receive loop
B=the incident magnetic field through the area enclosed by the loop
φ=angle between the normal to the plane of the loop and incident B-vector.

As was seen in FIG. 3, the H-field at the receive loop is the sum of the direct field from the transmit loop and the field from its image which subtracts from the transmit loop. This is good on lossy ground because field exists at a distance from the transmit loop.

Figure 5:
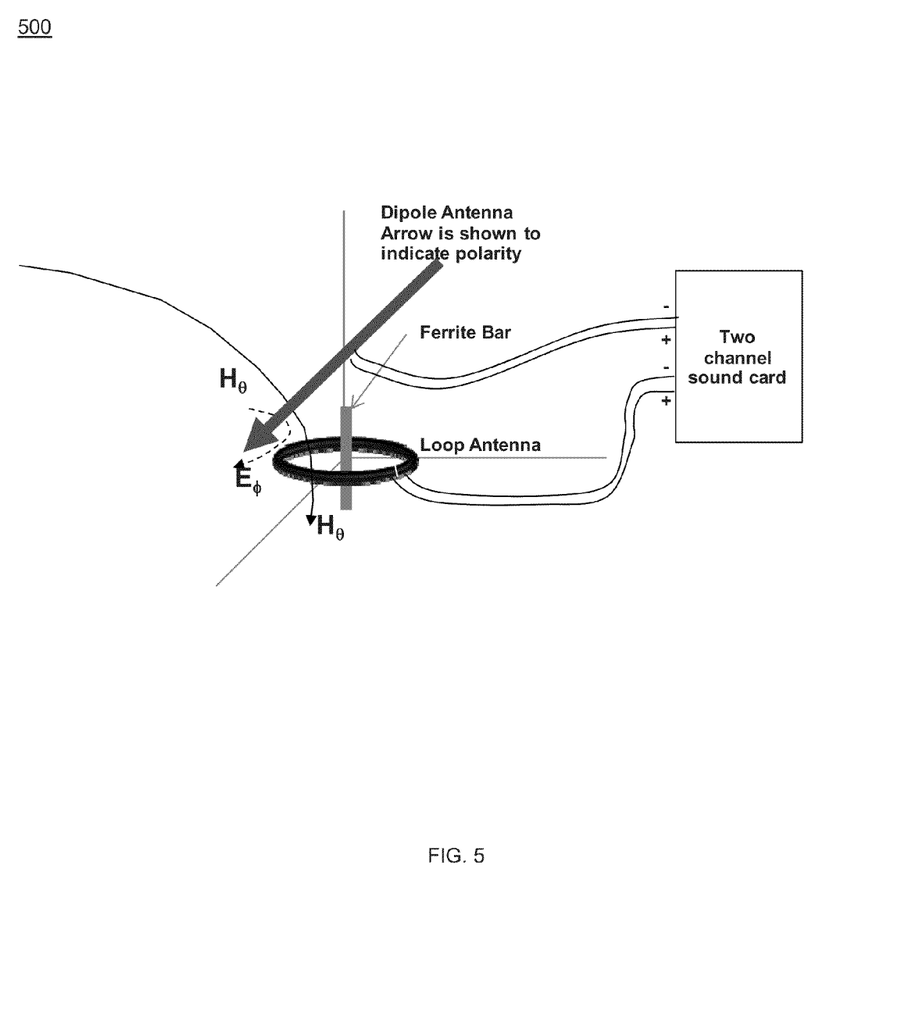
FIG. 5 depicts the received field polarity relationship between the magnetic field received by the loop and the electric field received by the dipole configured in accordance with one embodiment of the present invention.

FIG. 5 depicts the received field polarity relationship between the magnetic field received by the loop and the electric field received by the dipole identifies in which direction the signal is coming from. The line of the dipole points in the bearing of the source loop and its field is zero at that position. When the dipole is perpendicular to the direction of the source loop, its field is at a maximum. The polarity between the voltage of the loop and that of the dipole indication the direction along the DF bearing (whether front or back). As one gets closer, the E-field is much smaller than the H-field and the measurement becomes a gradient analysis in H-field amplitude.

Direction Finding (DF).

Examining the fields incident at the receive loop in FIG. 3, it is apparent that the E-field is orthogonal to the H-field especially if there are few reflections from magnetic obstacles. One can take advantage of this natural feature of the propagating wave and design an antenna system sensitive to each of the field components (E-field and H-field). Dipoles have their maximum gain when the dipole is lined up with the E-field. If the dipole is flipped 180 degrees, then the phase flips 180 degrees. If the dipole is 90 degrees to the incident E-field, then it senses nothing (0-volts). On the other hand, the loops have their maximum sensitivity to the H-field when their axes are lined up with the H-field (i.e., the H-field is perpendicular to the plane of the loop). From the orientation of the transmit and receive loops in FIG. 3, the receive loop is like an omni-directional receiver and cannot tell from which direction the signal is coming. However, it is proportional to the E-field. From the equations, we see that ratio of the E-term over the H-term is unique, especially when the $1/r^3$ term of the H-field starts becoming smaller than the other terms. Therefore, when combining the two readings, it is possible to identify the direction the signal. By using a two-channel receiver, it is possible to monitor both E and H field responses simultaneously.

When the individual approaches the transmit loop, the $1/r^3$ terms overwhelms the H-field and the E-field becomes more difficult to compare. At that distance, the amplitude of the H-field is changing rapidly $\sim 1/r^3$ and hence one can compare the next amplitude reading to the previous amplitude reading and see if the signal is increasing. If it is, then one is still moving in the correct direction to the transmit loop.

Transmit Loop Sideways Orientation.

There will be times when an air-dropped pallet will land on its side and hence the plane of the transmit loop will not be aligned with the ground. With a tipped pallet, the H-field will be the same in all directions. In this case, the received magnetic signal will not be up and down, but appear to be horizontally polarized. Hence, the E-field will be vertically polarized. It is possible if the axis of the loop is pointed towards the receiver that only an $H_r$-field will be measured and no E-field. In this case, for embodiments, the only applicable method to DF is to do amplitude comparisons. If the receiver is at right angles to $H_r$, then since $E_\Phi$ and $H_\theta$ are still proportional to each other, it would be possible to utilize the dipole/loop method explained above to DF.

Examples of a Transmitter and a Receiver Transmitter.

Figure 6:
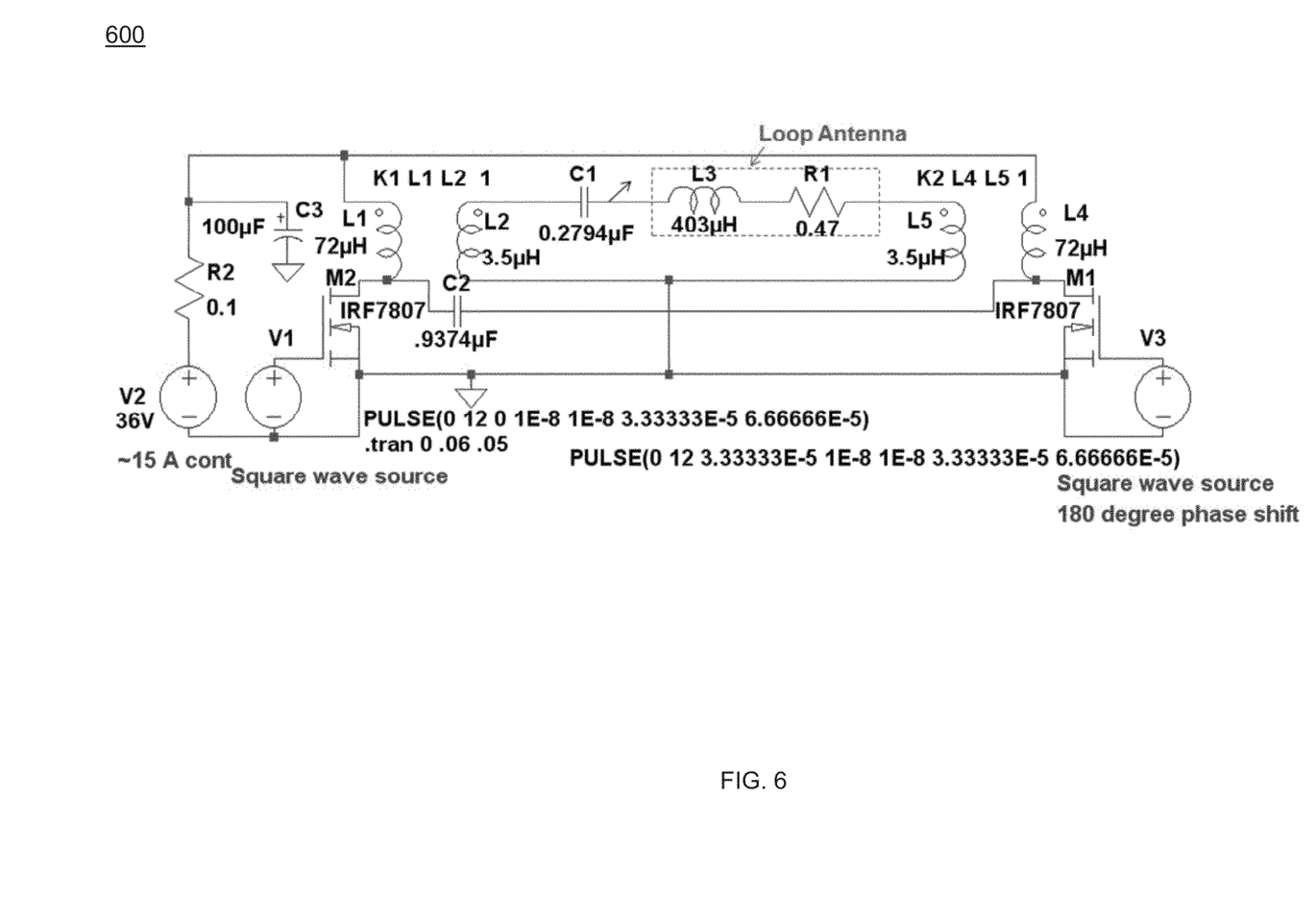
FIG. 6 depicts a VLF Class E Transmitter Circuit powering the transmit loop configured in accordance with one embodiment of the present invention.

FIG. 6 depicts a VLF Class E Transmitter Circuit 600 powering the Transmit loop. Not shown are pulse drivers or FSK that can encode the transmitted beacon signal. For embodiments, the transmitter can be a simple, efficient, push-pull class-E design as shown in FIG. 6 using moderately high voltage inexpensive power MOSFETs as the active switching devices. An example of this type MOSFET is the IRLIZ44GPBF (Vishay Siliconix part number for power MOSFET as of 19 Jan. 2009). These devices have been developed for the switching power supply industry. When operating at VLF frequencies, gate charge control times are much faster than the period of the signal frequency, so very high efficiency can be obtained, approaching that of the ideal class E (100%).

Effective push-pull operation is achieved in embodiments by coupling two asymmetrically driven devices' outputs in series through an output transformer into the very low impedance load. This output transformer is also employed to step up the load resistance to be compatible with the MOSFET operating voltage and current. The push pull architecture plus the high Q of the matching circuitry reduces the harmonic content greatly, and will achieve at least −40 dBC spurious output. Frequency stability better than 0.1 Hz is achieved by crystal control of the gate drive oscillator circuitry. Having a clear, stable frequency improves the ultimate sensitivity of the receiver. Design simulations and verification have used the circuit model in FIG. 6.

What is not shown in the figure is that a modulating circuit can be added that can encode a pulsed output or even an FSK signal to relay symbol information such as text and/or voice. The need to identify the pallets or the rally points or even the sending of text messages for embodiments requires the addition of modulators to the transmitter and some memory.

Receiver.

Embodiments of the receiver design are portable and mountable on an individual's arm or backpack to give full freedom to handle objects. The frequencies are so low, that, for example, a high quality 2-channel (stereo) computer sound card can perform the A/D sampling and be a receiver. To extend the range over which embodiments work, a low noise, high gain analog input with preselection and filtering can condition the signal before the A/D. Another, robust, design embodiment includes an automatic gain control (AGC) circuit that tracks in both channels prior to digitization. The digitized signal is processed and a user friendly output displayed. In embodiments, the comparison of the signals is done in software so that the individual can be given an indication of the direction of the beacon. For embodiments, there will be interaction between the software and the individual requiring motion (turning, walking) in order to ascertain the peak readings and directions.

Figure 7:
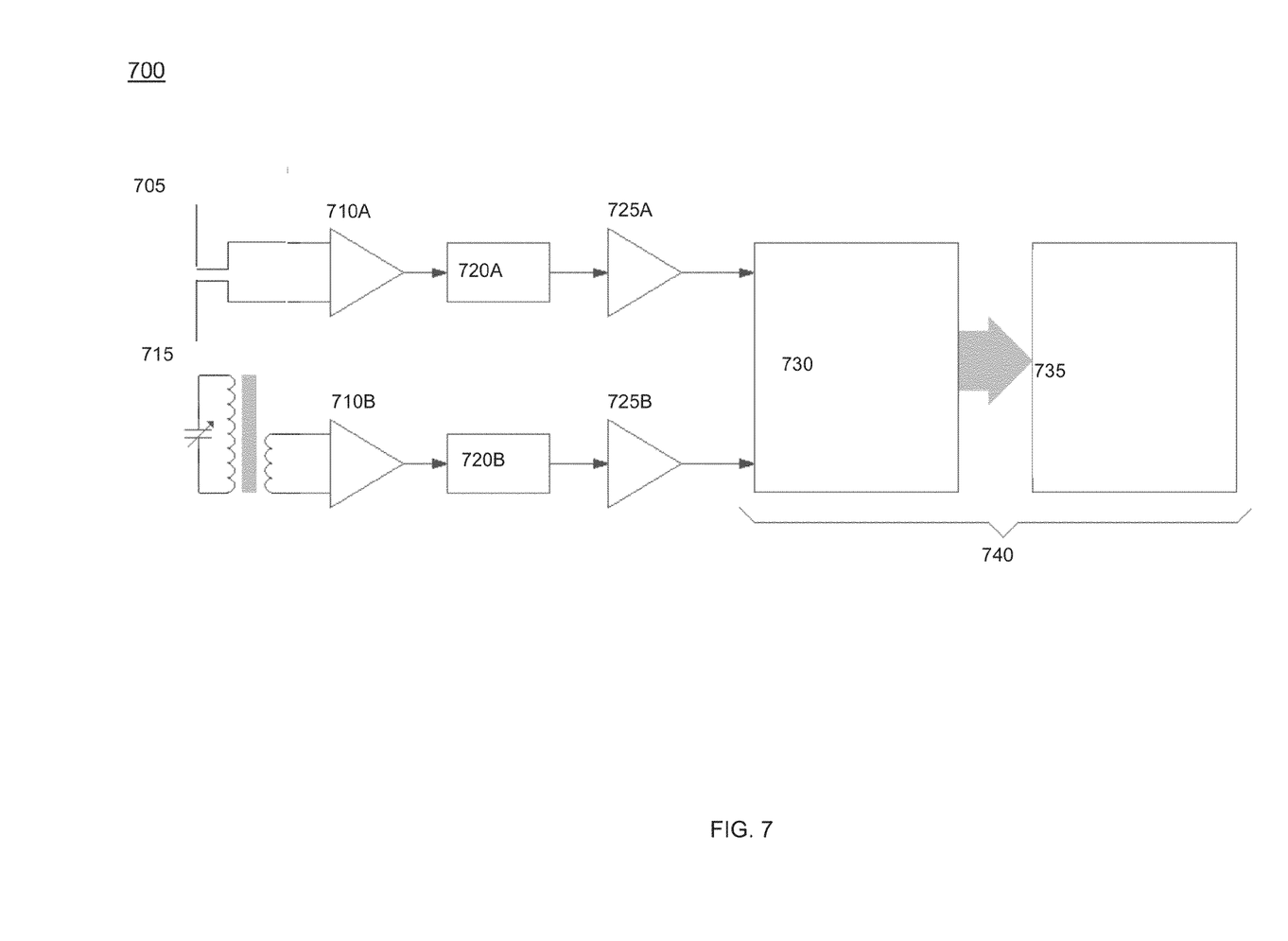
FIG. 7 depicts a block diagram of a receiver configured in accordance with one embodiment of the present invention.

FIG. 7 depicts a block diagram of a receiver embodiment 700. A simple tuned circuit was used in some embodiments. A two-channel receive block diagram is shown using a high quality audio sound card as the A/D sampler. In one embodiment, output of dipole antenna 705 provides input to low noise preamplifier 710A, receiving analog signals. Output of ferrite bar antenna #2 715 provides input to low noise preamplifier 710B, receiving analog signals. In embodiments, preamps 710A and 710B may be differential to cancel E-field noise. In embodiments, antennas are mounted 90 degrees relative to each other in a plane parallel to Earth surface. Outputs of low noise preamps 710A and 710B are input to filters 720A and 720B, respectively. Outputs of filters 720A and 720B are input to buffer amplifier/AGCs 725A and 725B, respectively. Outputs of buffer amplifier/AGCs 725A and 725B are input to 2/3 channel digitizer (embodiment of laptop sound card for 2 channels) 730. Output of 730 is input to an embodiment of laptop computing power with: signal processing; detection & decoding; and operator display 735. In embodiments, isolate 730 and 735 for low frequency EMI generated by processors, display drivers, etc. 740.

Figure 8:
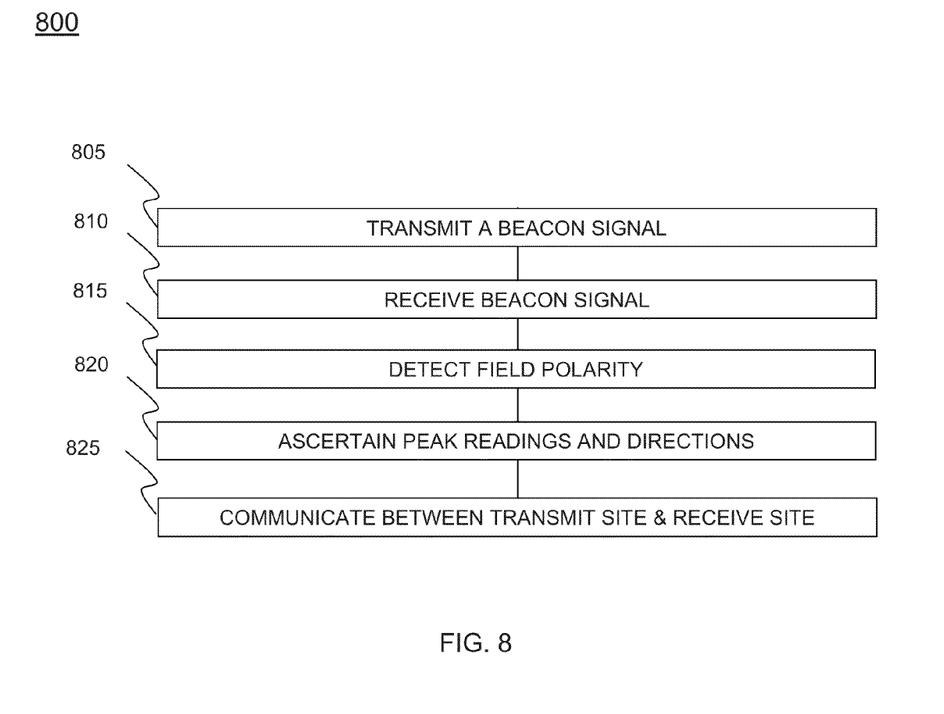
FIG. 8 depicts a flowchart for a method for near-field direction finding r configured in accordance with one embodiment of the present invention.

FIG. 8 depicts a flowchart 800 for a method for near-field direction finding comprising transmitting a beacon signal 805 from a VLF/ELF band transmit loop antenna at a transmit site comprising a VLF/ELF band transmitter at a beacon site. Receiving 810 the beacon signal at a receive site comprising a plurality of ferrite loaded loop receive antennas at a receive site and a receiver detecting field polarity 815 as received by the plurality of ferrite loaded loop receive antennas. The direction finding comprises motion (turning, walking) to ascertain the peak readings and directions 820. Near-field coupling between the transmit loop antenna and the plurality of ferrite-loaded loop receive antennas enables communication 825 between the transmit site and the receive site.

Expanded Paratrooper Rally Point Navigation Embodiments.

Airborne insertion of troops into a battle space ultimately requires the personnel to rally at specific locations for accountability prior to the next phase of their operation. Consequently each individual is left to their own devices to quickly make it to their appropriate area. In many complex operations there can easily be multiple rally points for specific members of a given set of units. (i.e. Medics to one area, rifle squad to their area, A-Company to their area, B-Company to their area, etc.). By utilizing a near-field transmitter sending an identifying code at each rally point, and each individual equipped with a receiver, they can rapidly and easily navigate to the appropriate rally point. The same receiver used to locate the appropriate rally point can be reset on-the-fly during operation to retune to a specific cargo identifier so that the appropriate individuals can quickly locate vital supplies and assets.

Vehicle to Vehicle Communications in a Jammed Environment Embodiments.

Present mounted operations often employ electronic jammers in an effort to mitigate the effectiveness of RF initiated IED threats. Due to the broadband application of RF energy employed troops are effectively jamming their own ability to communicate using their existing radios and Blue Force Tracking systems. Because of the low frequency and magnetic near field embodiments 'punch through' the jamming and transmit signals and enable text and voice communication within the convoy operation.

Remote Outpost/Coalition Outpost (COP)/Forward Operating Base (FOB)/Beyond Line-Of-Sight Communications Embodiments.

Many radio assets are unable to communicate beyond line of sight, through metallic buildings, or into tunnels. The near field based radio system has the ability to communicate 'over, around and through' most of the obstacles that are problematic for conventional RF. In many instances a simple text message is adequate to convey the necessary information.

Navigation in a GPS Denied Environment Embodiments.

Because near-field phenomenology of long wave RF does not require the presence of a GPS signal, it is possible to use several transmitters that are located geographically dispersed from each other to provide a reliable signal to gain reference points from. If locations of at least three transmitters are known, location can be determined based upon a triangulation of their signals.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

What is claimed is:

1. A near-field coupling beacon system comprising:
   a VLF/ELF band transmit loop antenna at one and only one transmit site;
   a VLF/ELF band transmitter;
   a plurality of ferrite loaded loop receive antennas at a receive site; and
   a receiver detecting field polarity as received by said plurality of ferrite loaded loop receive antennas;
   whereby near-field coupling between said transmit loop antenna and said plurality of ferrite-loaded loop receive antennas enables communication between said transmit site and said receive site.

2. The system of claim 1, wherein frequency band of operation is about 5 kHz to about 3 MHz and operation is independent of orientation of said transmit antenna.

3. The system of claim 1, wherein frequency band of operation is about 5 kHz to 50 kHz and operation is independent of orientation of said transmit antenna.

4. The system of claim 1, wherein frequency band of operation is about 50 kHz to about 3 MHz and operation is independent of orientation of said transmit antenna.

5. The system of claim 1, wherein said transmitting antenna comprises an air-core loop comprised of multiple turns of insulated wire wound on a cylindrical form.

6. The system of claim 1, wherein received field polarity relationship between magnetic field received by loop of said plurality of ferrite loaded loop receiving antennas and electric field received by dipole of said plurality of ferrite loaded loop receiving antennas identifies direction of signal source.

7. The system of claim 1, wherein said VLF/ELF band transmitter emits continuous carrier wave (cw).

8. The system of claim 1, wherein said VLF/ELF band transmitter emits pulsed continuous carrier wave (cw).

9. The system of claim 1, wherein transmission from said VLF/ELF band transmitter comprises simple binary frequency shift keying (FSK) whereby text messages are sent.

10. The system of claim 1, wherein transmission from said VLF/ELF band transmitter comprises pulsed continuous carrier wave (cw) whereby said receiver locates said VLF/ELF band transmitter beacon.

11. The system of claim 1, wherein operating terrain of said near-field coupling beacon system is lossy ground at frequency band of operation.

12. The system of claim 1, wherein a modulating circuit encodes at least one of a pulsed output and an frequency shift keying (FSK) signal to relay symbol information comprising text or voice or text and voice.

13. The system of claim 1, comprising a low noise, high gain analog input with preselection and filtering to condition the signal before analog to digital conversion.

14. The system of claim 1, comprising an automatic gain control (AGC) circuit tracking in both said VLF and said ELF bands prior to digitization.

15. The system of claim 1, wherein said receiver used to locate a rally point is reset during operation to retune to a specific identifier signal associated with assets whereby designated individuals quickly locate said assets.

16. The system of claim 1, wherein vehicle to vehicle communications in a jammed environment is provided that enables text and voice communication within a convoy operation.

17. The system of claim 1, wherein near-field phenomenology of said long-wave RF beacon comprises a plurality of transmitters located geographically dispersed from each other provide a reliable signal to gain reference points from whereby navigation in a GPS denied environment is provided.

18. A near-field coupling beacon communication system comprising:
   a VLF/ELF band transmit loop antenna at one and only one transmit site;
   a VLF/ELF band transmitter;
   a plurality of ferrite loaded loop receive antennas at a receive site; and
   a receiver detecting field polarity as received by said plurality of ferrite loaded loop receive antennas;
   whereby near-field coupling between said transmit loop antenna and said plurality of ferrite-loaded loop receive antennas provides communication between remote outpost, Coalition Outpost (COP), Forward Operating Base (FOB) and beyond line-of-sight locations, wherein said near-field coupling beacon system provides communication over, around and through obstacles degrading propagation at RF communication frequencies outside frequencies of said near-field coupling beacon system, whereby bit error rates are maintained.

19. A method for near-field direction finding comprising:
   transmitting a beacon signal from a VLF/ELF band transmit loop antenna at a single one and only one transmit site comprising a VLF/ELF band transmitter at a beacon site;
   receiving said beacon signal at a receive site comprising a plurality of ferrite loaded loop receive antennas at a receive site and a receiver detecting field polarity as received by said plurality of ferrite loaded loop receive antennas;
   whereby near-field coupling between said transmit loop antenna and said plurality of ferrite-loaded loop receive antennas enables communication between said transmit site and said receive site.

20. The method of claim 19, wherein said direction finding comprises motion to ascertain the peak readings and directions.

* * * * *